United States Patent [19]
Reo

[11] Patent Number: 5,482,591
[45] Date of Patent: Jan. 9, 1996

[54] LAMINATED SEALS AND METHOD OF PRODUCTION

[75] Inventor: Ned J. Reo, Scotia, N.Y.

[73] Assignee: Specialty Silicone Products, Inc., Ballston Spa, N.Y.

[21] Appl. No.: 309,527

[22] Filed: Sep. 20, 1994

Related U.S. Application Data

[63] Continuation of Ser. No. 969,429, Oct. 30, 1992, abandoned.

[51] Int. Cl.$^6$ ........................................... C09J 5/10
[52] U.S. Cl. ..................... 156/306.6; 156/280; 156/312; 215/247; 428/251; 525/479
[58] Field of Search ................ 156/306.9, 629, 156/280, 312, 306.6; 428/251; 422/103; 215/247; 525/103, 479

[56] References Cited

U.S. PATENT DOCUMENTS

| | | | |
|---|---|---|---|
| 3,551,273 | 12/1970 | McKinney | 215/247 |
| 3,813,364 | 5/1974 | De Zuba et al. | 525/479 |
| 4,066,183 | 1/1978 | Armstrong | 215/247 |
| 4,105,819 | 8/1978 | Kotcharian | 428/251 |
| 4,378,403 | 3/1983 | Kotcharian | 428/251 |

*Primary Examiner*—John J. Gallagher
*Attorney, Agent, or Firm*—Schmeiser, Olsen & Watts

[57] ABSTRACT

A laminated impermeable head seal or cap liner is provided in the form of an aluminum foil-packed fiber glass cloth sheet bonded to a silicone rubber sheet. The seal or liner is flexible and resilient to the extent that it can be bent double and twisted 90° repeatedly without loosening or cracking of the aluminum foil.

3 Claims, 1 Drawing Sheet

LAMINATED SEALS AND METHOD OF PRODUCTION

This application is a continuation of application Ser. No. 07/969,429 filed Oct. 30, 1992, now abandoned.

FIELD OF THE INVENTION

This invention relates generally to the sealing art, and is more particularly concerned with novel laminated, impermeable seals having special utility as fluid tight septa and self resealing closures for liquid specimen-containing vessels and with an unique method for making them.

BACKGROUND OF THE INVENTION

A number and variety of sealing means and materials have been developed in response to the demand for sealing means for closing vessels and for compartmentalizing them liquid and gas tightly. Heretofore, the best septa for these purposes have not been reliably gas tight and have not been self closing after a few or several syringe punctures. Attempts to overcome these shortcomings have led to a development of composite bodies of plastic materials in laminar form with a cover of metal foil intended to make the assembly gas tight. Bonding of the laminae, however, is still an important problem, and so is maintaining the sealing integrity of the metal foil by preventing wrinkling, crinkling, bubbling and cracking of the foil as it is secured to a flexible and resilient body.

SUMMARY OF THE INVENTION

By virtue of this invention, which is based upon my discoveries and new concepts set forth below, septa free from the foregoing problems and difficulties can be provided for a number and variety of purposes as head gas seals, EPA water sampler seals and the like. Further, these important results and advantages can consistently be obtained without offsetting cost or other significant disadvantage. Still further, but also importantly, the product of this invention has a self resealing characteristic which is unique in that 20 or 30 or more samples may be withdrawn by syringe through these septa without loss of liquid impermeability. Additionally, in accordance with this invention one has the choice between a less expensive general purpose product for relatively low temperature (below 177° C.) service and a high temperature, low volatiles content product for use up to 300° C. Finally, this invention affords a choice between a number and variety of different plastic materials and metal foils to suit the septa manufacturers and users purposes.

One of my discoveries is that the absolute gas impermeability of metal foil can be preserved intact by attaching the foil to a fiberglass cloth sheet and then bonding the fiberglass sheet to a relatively thick sheet of silicone rubber or similar flexible and resilient body. The problems of wrinkling, crinkling, bubbling and cracking of the foil are thereby overcome completely. Also, I have found that as so constructed and produced the resulting metal foil-covered, plastic, composite laminated body can be punctured surprisingly often by a sampling syringe or the like while still retaining its vitally important liquid tightness.

Another novel concept of mine underlying this invention is that of filling the silicone rubber body with a heat curable bonding material such as triallylcyanurate (TAC), methyl hydroxysilicone or the like, and then heating the metal foil, glass cloth and silicone rubber assembly to cure the TAC while the parts are pressed together.

Still another new concept of mine is that of heating the silicone rubber body to outgas it without curing the TAC prior to assembling the metal foil with the silicone rubber body. The tendency for the foil to bubble during the final heating and curing stage is thereby controlled or eliminated.

Briefly described, an article of this invention is a flexible and resilient impermeable septum which comprises a composite laminated body of a sheet of silicone rubber, metal foil, and a sheet of glass cloth between and bonded to the silicone rubber sheet and attached to the metal foil.

Similarly described in its method aspect, the present invention comprises the steps of attaching a metal foil to a sheet of glass cloth and bonding a silicone rubber sheet to the glass cloth sheet thus providing a flexible and resilient impermeable septum as described above.

BRIEF DESCRIPTION OF THE DRAWINGS

This invention is illustrated in the drawings accompanying and forming a part of the present specification, in which.

DETAILED DESCRIPTION OF THE INVENTION

Figure 4:
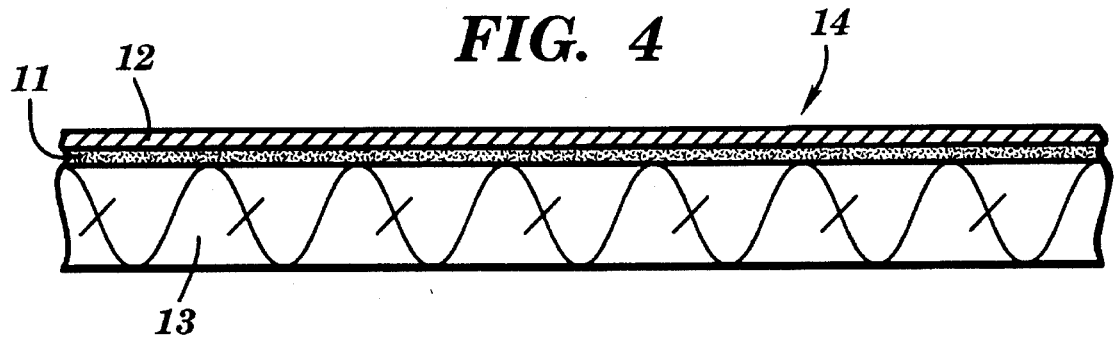
FIG. 4 is an enlarged vertical sectional view of the foil and glass cloth component of FIG. 2, the section being taken at 4 of FIG. 2.

In the presently preferred practice of this invention, a metal backed septum 10 of silicone rubber is produced in the form of a multilayer composite body. A Mylar™ resin sheet 11 (FIG. 4) etched on both sides is disposed between aluminum foil 12 and a sheet of glass fiber cloth 13, and the assembly is pressed and heated with the result that aluminum foil 12 and glass cloth 13 are bonded together as a laminated body 14 about 10 mils thick, the aluminum foil and the resin sheet each being about 0.5 mil thick. A sheet 15 of silicone rubber about one-sixteenth inch thick is filled with TAC and the foil and cloth body 14 and silicone sheet 15 are assembled with cloth 13 in contact with one side of silicone sheet. This assembly is then pressed and heated at about 250° C. for seven minutes to cure the TAC which securely and permanently bonds body 14 and silicone sheet 15 together.

In a full scale production operation the several laminae are brought together in the manner stated above and the bonded laminated composite product 10 is cut to provide a plurality of septa of desired cross sectional size and shape.

As indicated above, other materials may be used in producing the products of this invention for a number and variety of different uses and conditions. For instance, stainless steel foil may be preferable to aluminum foil in some cases and can be used in the manner just described. Likewise, such thin sheets or foils of other metals may be so used.

If desired, Teflon™ plastic may be substituted for Mylar plastic as the inner layer of laminated body 14 and other thermoplastic materials sharing the bonding characteristic and inertness of Mylar plastic in this system and procedure may also be so used. In short any plastic or other adhesive material which is inert or non-detrimental to the foil or the cloth is suitable.

Any glass fiber cloth will serve the purpose so long as it is tightly woven and has no sizable discontinuity which could leave the metal foil unsupported against crinkling, cracking and bubbling or bulging stresses in production and use.

The thickness of laminated body 14 is largely a matter of choice of the user. In general, there is no sealing performance advantage to be gained by doubling the thickness of any of the metal, cloth or silicone rubber components beyond that above, but there may be a significant cost penalty. It is important only that body 14 successfully withstand production and anticipated use conditions.

For high temperature (above 177° C.) service silicone rubber of 50–55 durometer is used in accordance with this invention for sealing applications in which nonpermeability and low volatiles content are required. Again, in these instances the silicone rubber is bonded to the metal foil as described above.

Other silicone rubber materials may be used in providing the novel articles of this invention intended for service conditions at temperatures below 177° C. The volatiles content of these rubbers, accordingly, may be somewhat higher than that of the high temperature service silicone rubber product of this invention, but the strength and tear resistance must be such as to withstand the service conditions.

Figure 1:
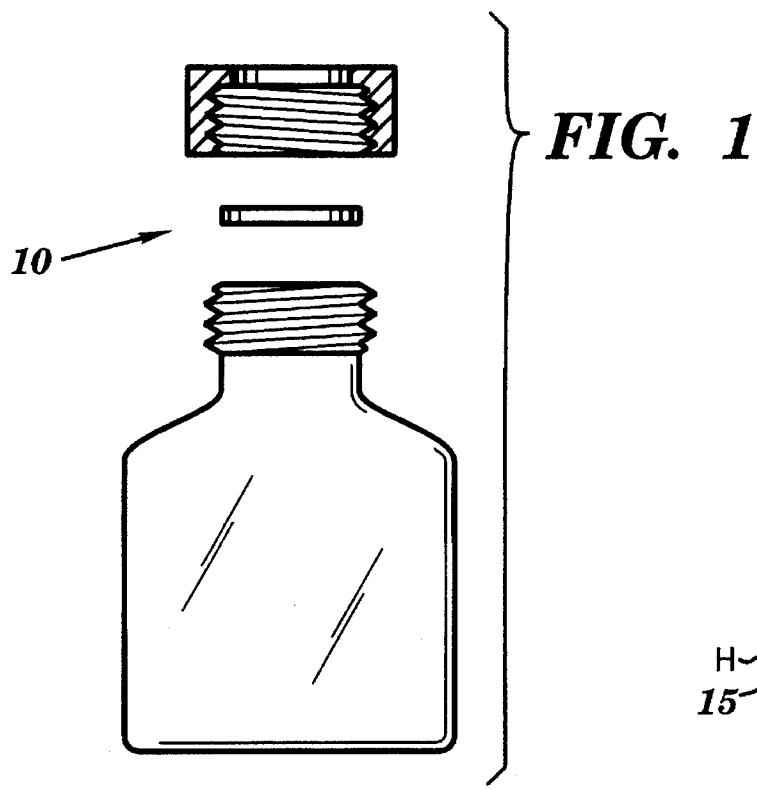
FIG. 1 is a side elevational view of a vial showing the cap in vertical section and a septum of this invention as a liner for the cap disposed for assembly with the cap and vial.
Figure 3:
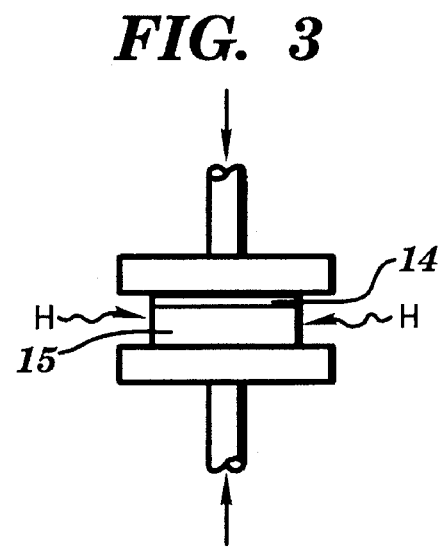
FIG. 3 is a side elevational view of septum of FIG. 1 in the final production stage in a heated press.
Figure 2:
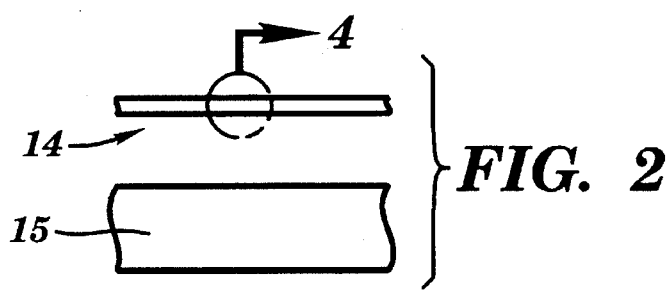
FIG. 2 is an enlarged side elevational view of the metal foil and fiber glass cloth components of the septum of FIG. 1 and the silicone rubber sheet prior to permanent bonding of them together.
Figure 5:
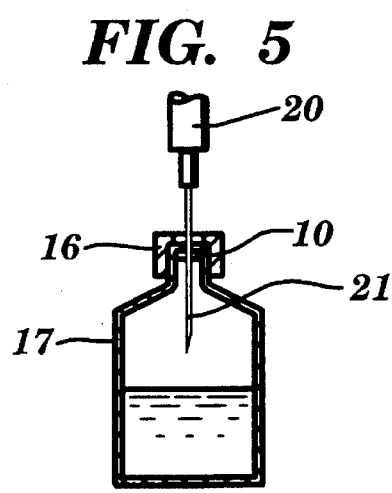
FIG. 5 is a view in vertical section of a sampler vial fitted with a cap liner of this invention, a syringe with standard needle being shown in use in withdrawing a sample for test.

As illustrated in FIG. 5, septum 10 is used as a cap liner or head seal in cap 16 fitted on and closing sample vial 17 liquid and gas tightly. Syringe 20 is disposed to take a sample of head gas or liquid content of vial 17, needle 21 of syringe 20 being inserted into the vial through an opening in the top of the cap and through septum 10. If this is the initial puncture of the cap liner, it will not again be reliably gas tight but since the silicone rubber of the liner is not cored by the needle and is thus effectively self resealing, the vial remains liquid tight.

Those skilled in the art will gain a further and better understanding of this invention and the new results and advantages thereof, upon consideration of the following illustrative, but not limiting, example of actual practice of this invention.

EXAMPLE

A thin (0.5 mil) sheet of Mylar resin etched on both sides was sandwiched between a 0.5 mil aluminum foil sheet and a 9-mil sheet of fiber glass cloth. The sheets were then pressed firmly together and heated, to cure the resin, permanently bonding the parts together as a unitary body. This product is marketed by Alpha Associates of Woodbridge, N.J. under the designation 138 AMA.

The top of a one-sixteenth inch sheet of 50-durometer silicone rubber filled with TAC was covered with the aluminum foil and cloth body with the cloth in contact with the silicone rubber sheet. Heat and pressure were applied to cure the TAC and bond the silicone rubber to the glass fiber cloth.

The resulting composite laminated body in sheet form was cut to size to provide cap liners and gas chromatograph septa, all of which proved to be liquid and gas tight with the metal foil and silicone rubber sheet permanently tightly united in a flexible body. In fact, in testing the resilience and flexibility of these laminated bodies, it was found that they retained their original integrity after being bent double repeatedly and twisted through 90° ten times, the foil remaining crack-free and gas impervious and still affixed to the silicone rubber sheet as at the outset of the test. Then to determine the liquid and gas tightness of these products, they were punctured with a standard syringe 0.028 inch diameter needle. The silicone rubber component was not cored by the puncturing and consequently retained liquid tightness after 20 needle penetrations. The gas tightness of the foil, however, was lost to increasing extent with each puncturing event because of coring action.

These results compare with those obtained in the same test of prior art septa described above r.e., those which have no interlayer of fiberglass cloth, which failed after only one or two bending or flexing actions. The metal foil pulled loose from the plastic body immediately and tended to crack in wrinkled and crinkled regions and the sepia then were no longer gas tight.

Having thus described this invention so that others skilled in the art can understand and practice the same, I state that what I desire to secure by Letters Patent is defined in what is claimed.

What is claimed is:

1. Method of producing a gas-tight metal-backed septum of permeable silicone rubber sheet and crack- and crinkle-free metal foil which consists of the steps of bonding one side of a metal foil to one side of a thermoplastic resin sheet, bonding one side of a tightly-woven glass cloth sheet having no sizeable discontinuity to the other side of the thermoplastic resin sheet, and finally bonding one side of a silicone rubber sheet to the other side of the woven glass cloth sheet.

2. The method of claim 1 including the steps of filling the silicone resin sheet with heat-curable adhesive material prior to bonding the silicone rubber sheet to the glass cloth sheet, and heating the assembly and curing the adhesive and thereby bonding the silicone rubber sheet to the woven glass fiber cloth sheet.

3. The method of producing a gas-tight, metal-backed septum of silicone rubber sheet and crack- and crinkle-free metal foil which consists of the steps of placing a thermoplastic resin sheet between the sheet of metal foil and a sheet of glass cloth and then heating and pressing the resulting assembly, thereby bonding the metal foil and the glass cloth and resin sheet together as a laminated body, assembling the laminated body and a silicone rubber sheet with the cloth sheet of the body in contact with one side of the silicone rubber sheet, then pressing and heating the resulting total assembly and thereby, permanently bonding the silicone rubber sheet and the laminated body together.

* * * * *